United States Patent

Diepeveen

[15] 3,672,556

[45] June 27, 1972

[54] WIRE CLAMP

[72] Inventor: John C. Diepeveen, 1737 Kimberly Drive, Sunnyvale, Calif. 94087

[22] Filed: July 13, 1970

[21] Appl. No.: 54,500

[52] U.S. Cl. ....................................228/47, 228/3, 269/161, 269/224

[51] Int. Cl. ..........................................................B23k 37/04

[58] Field of Search ...............269/157, 161, 224; 228/3, 3.5, 228/4, 44, 47

[56] References Cited

UNITED STATES PATENTS

| | | | |
|---|---|---|---|
| 3,265,338 | 8/1966 | Henderson | 269/157 X |
| 3,179,260 | 4/1965 | Ferlen | 228/3.5 X |
| 3,083,291 | 3/1963 | Soffa et al. | 228/3.5 X |
| 2,850,926 | 9/1958 | Jobe | 269/157 X |

*Primary Examiner*—John F. Campbell
*Assistant Examiner*—R. J. Craig
*Attorney*—Townsend and Townsend

[57] ABSTRACT

An improved wire clamp for use with a wire-bonding machine to sever wires of the order of 1 to 10 mils wherein the wire clamp includes a pair of relatively shiftable jaws, a power device, and spring means for effecting relative movement of the jaws when the power device is actuated. The tension of the spring means can be adjusted to vary the pressure exerted on a wire between the jaws. The clamp has means thereon for attaching the same to a wire-bonding machine.

9 Claims, 4 Drawing Figures

INVENTOR.
JOHN C. DIEPEVEEN

BY Townsend and Townsend

ATTORNEYS

WIRE CLAMP

This invention relates to improvements in the handling of very fine wires and, more particularly, to an improved wire clamp for gripping wires in the range of 1 to 10 mils.

In wire bonding operations, it is necessary to grip a wire bonded to a semiconductor chip and then to pull the wire away from the chip to sever the wire at the bond thereon. Thus, excess wire is removed from the chip. The wire separated from the chip is usually carried on a spool; thus, after separation from the chip, it is ready to be bonded to the next bond location on the chip.

Wires used for this purpose are extremely small in diameter such as of the order of 1 to 10 mils. It is, therefore, important that the wire be firmly gripped without being damaged while at the same time the wire continues to extend through the central opening of a capillary holder normally associated with the wire-bonding tool. Wire clamps of conventional construction have been unsatisfactory because they generally secure the actuating means thereof directly to the jaws which clamp the wire. This prevents such a power device from moving through the full displacement or maximum stroke when it is actuated if a wire is between the jaws. Thus, a solenoid actuator used to close the jaws will become overheated and its armature will tend to vibrate because of the continued tendency to traverse the maximum stroke distance. Such overheating limits the operating life of the power device and the armature vibrations are transferred to the jaws so as to adversely affect the clamping action of the jaws.

The present invention provides an improved wire clamp for a wire-bonding machine which overcomes the above problem and includes a power device coupled to a pair of relatively shiftable jaws and which can operate at full stroke each time it is actuated. In this way, the heating and vibration problems mentioned above are eliminated while a wire between the jaws can be firmly clamped without being subjected to excessive pressure. These advantages are realized by the use of a spring means which couples the power device with the jaws. Thus, the spring means will yield when a wire is clamped between the jaws while the power device is operated at full stroke. Also, the tension of the spring can be adjusted so that pressure on the wire between the jaws can be varied. Such adjustment does not alter the fact that the power device is operable at all times at full stroke.

The spring serves another purpose in that it absorbs the shock caused by the sudden actuation of the power device. Thus, any such shock is effectively isolated from the jaws or a wire therebetween.

The primary object of this invention is to provide an improved wire clamp for a wire bonding machine for use in severing very fine wires from semiconductor chips wherein the wire clamp has a power device for closing a pair of relatively shiftable jaws with the power device being operable at all times at full stroke to substantially eliminate overheating of the power device and any vibrations which may arise due to actuation of the power device at less than full stroke.

Another object of this invention is to provide a wire clamp of the type described which has spring means coupling the power device with the jaws so that the yieldability of the spring will permit the mechanical movement of the power device to be at all times at full stroke and variations in jaw pressure on a wire clamped between jaws can be made by adjusting the tension of the spring.

A further object of this invention is to provide a wire clamp of the aforesaid character wherein the spring operates to absorb the shock due to the sudden actuation of the power device so that such shock is not transmitted to the jaws or to a wire therebetween.

Other objects of this invention will become apparent as the following specification progresses, reference being had to the accompanying drawing for an illustration of an embodiment of the invention.

Figure 1:
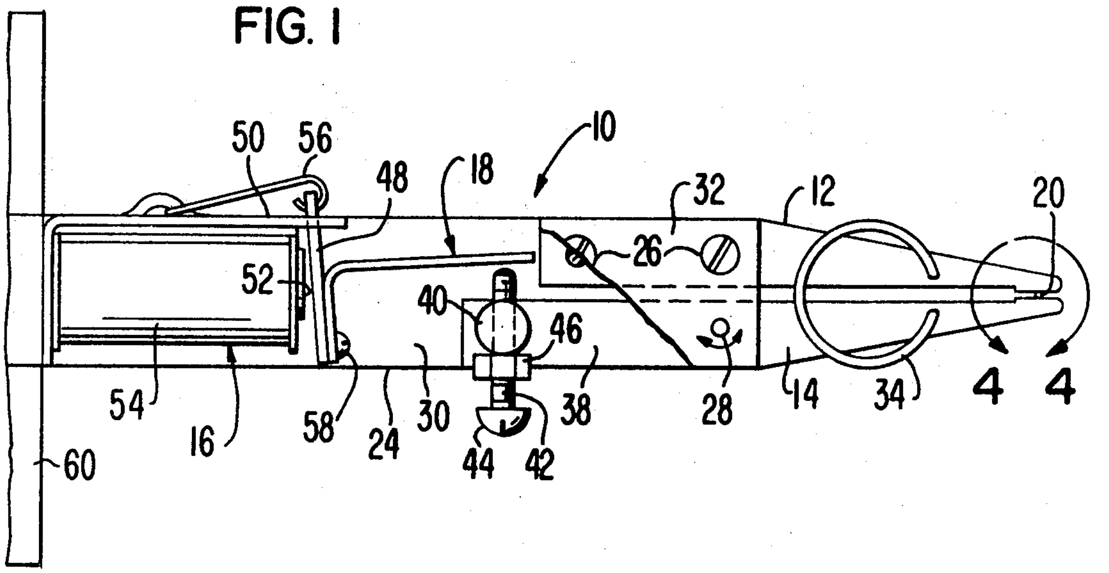
FIG. 1 is a top plan view of the wire clamp of this invention.

The wire clamp of this invention is denoted by the numeral 10 and includes a pair of jaws 12 and 14, a power device 16, and a movable spring 18 coupling the jaws with the power device so that the jaws will move relative to and toward each other when the power device is actuated. The jaws will then be able to clamp a wire 20 positioned between the end portions 22 (FIG. 4) of the jaws to thereby releasably hold the wire fixed relative to the jaws.

End portions 22 are long and tapered so that they have the proper shape for insertion into the central opening of a capillary holder normally associated with a wire-bonding tool. Such a holder has means for receiving a very fine wire, such as a wire whose diameter is in the range of 1 to 10 mils. End portions 22, when received in the capillary holder, can grip the wire and hold it as the wire clamp is moved away from a semiconductor chip to which the wire has previously been bonded by the bonding tool. Thus, the wire is severed at the bond on the chip. Thus, no excess wire projects outwardly from the chip.

Figure 2:
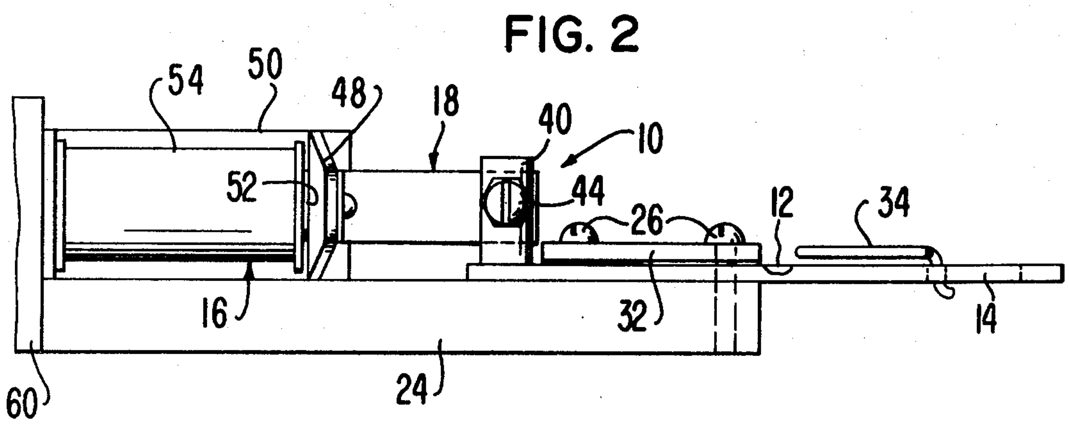
FIG. 2 is a side elevational view of the wire clamp.

The jaws are mounted on a support 24 with jaw 12 being fixed to the support by screws 26. A pin 28 carried by support 24 and projecting upwardly from its upper surface 30 pivotally mounts jaw 14 on the support for movement about the axis of the pin. In this way, jaw 14 can be moved toward jaw 12 to cause wire 20 to be clamped between end portions 22. To support the upper end of pin 28, a plate 32 is provided, the plate being secured by screws 26 to jaw 12 and thereby support 24. The thickness of jaw 14 is less than that of jaw 12 as shown in FIG. 2 so that jaw 14 is free to pivot between surface 30 and plate 32 and about pin 28 through a limited arc. An arcuate spring 34 coupled at its ends to the jaws biases the same away from each other.

Figure 4:
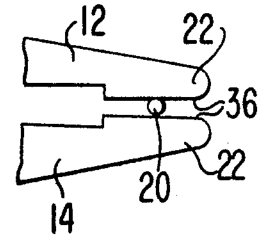
FIG. 4 is an enlarged, fragmentary plan view of the jaws of the wire clamp in the vicinity of the arcuate line 4—4 of FIG. 1.
Figure 3:
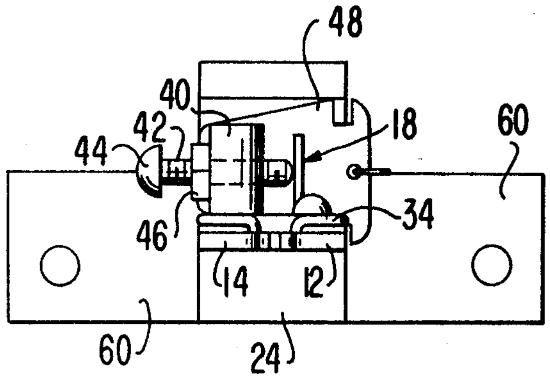
FIG. 3 is a front elevational view thereof.

As shown in FIG. 4, end portions 22 have respective wire engaging surfaces 36. These surfaces are preferably maintained substantially parallel at all times to properly grip the wire in a manner to prevent its removal from between the jaws when the latter extend into the capillary holder of a wire-bonding machine. To allow for adjustment of the jaws so that these surfaces will be parallel, jaw 12 will have over-sized holes for receiving screws 26. In this way, the jaw can be manipulated until surfaces 36 are substantially parallel. Normally, the spacing between the jaws when the same are forced apart by spring 34 will be approximately 0.010 inch. Surfaces 36 must be substantially parallel to be able to grip a wire having a thickness of approximately 0.001 inch.

Jaw 14 has a rear extension 38 provided with a post 40 extending upwardly from the jaw. A screw 42 having a head 44 is threadably mounted on jaws 40 and projects outwardly therefrom toward spring 18. A nut 46 on the screw adjustably limits the travel of the screw toward the spring. The end of the screw is in the path of travel of the spring and is engaged thereby to cause movement of jaw 14 when power device 16 is actuated. Also, screw 42 allows the tension of spring 18 to be varied, whereby variations in the jaw pressure on wire 20 can be obtained.

Power device 16 has a movable portion to which the spring is connected. For purposes of illustration, power device 16 compresses a solenoid having a movable armature pivotally mounted on a slide plate 50 for movement toward and away from the core 52 in the solenoid coil 54. The solenoid is secured to support 24 in any suitable manner, and a spring 56 biases the armature away from the core.

Spring 18 is a leaf spring having an L-shaped configuration. One part of the spring is sufficiently long so that it is capable of engaging the adjacent end of screw 42 when armature 48 pivots toward core 52. When the spring engages the screw, it causes jaw 14 to pivot toward jaw 12 so that a wire 20 between surfaces 36 will be clamped thereby. Since the spring is resilient, it will yield and thereby flex for continued movement of the armature toward core 52 after the spring has initially engaged the screw. This feature allows armature 48 to move through its maximum stroke or displacement, i.e., to a location at which it engages core 52, when coil 54 is energized by an electrical current. This yielding of the spring will not affect its ability to cause movement of jaw 14. The jaw will still be able to move toward the other jaw to clamp a wire therebetween Screw 42 allows for adjustment in the amount by which the spring is caused to yield. Thus, the restoring force of the spring is the source of the pressure exerted on wire 20 by jaws 12 and 14. For relatively light pressure on the wire, screw 42 will be at a location on post 40 where the spring will have a minimum flexure when the power device is actuated; whereas, for maximum pressure exerted on the wire, the screw will be at a location to cause maximum flexure of the spring.

In use, wire clamp 10 is secured by a bracket 60 to a moveble part of a wire-bonding machine and is generally movable along a vertical path since a wire-bonding tool moves downwardly toward a semiconductor chip during a bonding operation. Bracket 60 is connected to one end of support 24, as shown in FIG. 2. With a wire 20 between surfaces 36, the solenoid is energized to cause movement of armature 48 toward core 52. This causes spring 18 to move into engagement with the end of screw 42 and this, in turn, causes jaw 14 to pivot toward jaw 12 about pin 28. Jaw 14 will move sufficiently far to cause wire 20 between the jaws to be engaged by surface 36 and to be clamped thereby. Spring 18 will be flexed when armature 48 has moved the full distance toward core 52, the amount of flexure being dependent upon the setting of the screw on post 40.

When the wire is clamped, it can be moved upwardly by the wire clamp to cause the wire to be severed at the bond and pulled away therefrom. Thereafter, the power device is deactivated, whereupon spring 56 returns armature 48 to its initial position and spring 34 moves jaw 14 away from jaw 12. The wire is then free to move between the jaws.

Spring 18 provides several advantages, firstly, it allows armature 48 to move through its maximum distance or stroke each time the solenoid is energized. This feature assures that the armature will not be merely half way toward core 52 when the wire is clamped. Thus, vibrations resulting from the tendency for the armature to be pulled all the way to the core will be eliminated. Also, overheating of coil 54 will be avoided.

Secondly, the tension of the spring can be adjusted by screw 42. In this way, variations in the pressure exerted on wire 20 can be obtained.

Thirdly, spring 18 absorbs the shock resulting from the movement of the armature into engagement with core 52. This shock is therefore, isolated from the jaws and thereby the wire therebetween.

I claim:

1. A wire clamp comprising: A support; a pair of jaws, one of the jaws being fixed to the support and the other jaw being shiftably mounted on the support; means mounting the jaws adjacent to each other for relative movement with respect to each other, whereby the jaws can move toward each other to clamp a wire therebetween; means coupled with the jaws for biasing the same away from each other; an actuatable power device; and means coupled with the power device and yieldably engageable with said other jaw for moving the latter relative to said support and toward said one jaw when the power device is actuated.

2. A wire clamp as set forth in claim 1, wherein said other jaw is pivotally mounted on said support, said moving means including a spring.

3. A wire clamp comprising: a pair of jaws; means mounting the jaws adjacent to each other for relative movement with respect to each other, whereby the jaws can move toward each other to clamp a wire therebetween; means coupled with the jaws for biasing the same away from each other; an actuatable power device; a spring coupled with the power device and yieldably coupled with said jaws for moving the latter relative to and toward each other when the power device is actuated; and means coupled with the spring for adjusting the tension thereof.

4. A wire clamp comprising: a pair of jaws, one of said jaws having an extension; means mounting the jaws adjacent to each other for relative movement with respect to each other, whereby the jaws can move toward each other to clamp a wire therebetween; means coupled with the jaws for biasing the same away from each other; an actuatable power device having a movable member; and a spring secured to said member and engageable with said extension for moving the latter relative to and toward each other when the power device is actuated.

5. A wire clamp as set forth in claim 4, wherein said extension has an adjusting device shiftably mounted thereon, said spring being engageable with the device to cause movement of said one jaw when the power device is actuated.

6. A wire clamp comprising: a pair of jaws; means mounting the jaws adjacent to each other for relative movement with respect to each other, whereby the jaws can move toward each other to clamp a wire therebetween; means coupled with the jaws for biasing the same away from each other, an actuatable power device; and yieldable means coupled with the power device and coupled with said jaws for moving the latter relative to and toward each other when the power device is actuated.

7. A wire clamp comprising: a support; a first jaw rigidly mounted on the support and projecting outwardly therefrom; a second jaw; means pivotally mounting the second jaw on the support adjacent to the first jaw for movement toward and away from the latter, whereby a wire can be clamped between the jaws; means coupled with the jaws for biasing the latter away from each other; an actuatable power device carried by the support and spaced from the jaws, said power device having a movable member; and resilient means carried by said movable member for moving the second jaw toward the first jaw when the power device is actuated.

8. A wire clamp as set forth in claim 7, wherein said resilient means comprises a leaf spring.

9. A wire clamp as set forth in claim 8, wherein is provided an adjustment screw on the other jaw, said screw having an end in the path of travel of the spring.

* * * * *